(12) United States Patent
Tiilikainen et al.

(10) Patent No.: US 9,085,206 B2
(45) Date of Patent: Jul. 21, 2015

(54) COUPLING ARRANGEMENT FOR A DOLLY AND A DOLLY

(75) Inventors: Markku Tiilikainen, Söderkulla (FI); Jack Grönholm, Söderkulla (FI)

(73) Assignee: K. HARTWALL OY AB, Soderkulla (FI)

( * ) Notice: Subject to any disclaimer, the term of this patent is extended or adjusted under 35 U.S.C. 154(b) by 0 days.

(21) Appl. No.: 13/990,820

(22) PCT Filed: Dec. 1, 2010

(86) PCT No.: PCT/FI2010/050987
§ 371 (c)(1),
(2), (4) Date: May 31, 2013

(87) PCT Pub. No.: WO2012/072856
PCT Pub. Date: Jun. 7, 2012

(65) Prior Publication Data
US 2013/0241177 A1 Sep. 19, 2013

(51) Int. Cl.
*B60D 1/00* (2006.01)
*B62B 3/00* (2006.01)
*B60D 1/02* (2006.01)
*B60D 1/36* (2006.01)
*B60D 1/48* (2006.01)
*B62B 5/00* (2006.01)
*B60D 1/145* (2006.01)
*B60D 1/54* (2006.01)
*B60D 1/01* (2006.01)
*B62B 5/06* (2006.01)

(52) U.S. Cl.
CPC .. *B60D 1/00* (2013.01); *B60D 1/01* (2013.01); *B60D 1/02* (2013.01); *B60D 1/145* (2013.01); *B60D 1/363* (2013.01); *B60D 1/481* (2013.01); *B60D 1/54* (2013.01); *B62B 3/00* (2013.01); *B62B 5/0079* (2013.01); *B60D 2001/005* (2013.01); *B62B 3/007* (2013.01); *B62B 5/068* (2013.01); *B62B 2207/00* (2013.01)

(58) Field of Classification Search
CPC .................................. B60D 1/02; B60D 1/363
USPC .................... 280/79.1, 408, 410, 492, 493
See application file for complete search history.

(56) References Cited

U.S. PATENT DOCUMENTS

| 1,610,902 A | 1/1920 | Tomlinson |
| 1,626,993 A | 5/1927 | Williams |
| 3,637,236 A * | 1/1972 | Shimoji et al. ................ 280/419 |

(Continued)

FOREIGN PATENT DOCUMENTS

| DE | 10059256 A1 | 6/2002 |
| GB | 2 175 262 A | 11/1986 |

*Primary Examiner* — Joseph Rocca
*Assistant Examiner* — Jacob Knutson
(74) *Attorney, Agent, or Firm* — Birch, Stewart, Kolasch & Birch, LLP

(57) ABSTRACT

Coupling arrangement for a dolly, and a dolly equipped with such an arrangement, includes a female connecting part and a male connecting part. The male connecting part includes a draw bar and a connecting peg and the female part comprises an at least partially closed recess having an area limited by at least partially closed wall having a height and including at least a concave guiding part and a ceiling positioned to form the at least a partially closed recess with the wall. A hole is provided in the ceiling at the tip of the concave part of the wall dimensioned to receive the connecting peg.

15 Claims, 6 Drawing Sheets

(56) References Cited

U.S. PATENT DOCUMENTS

| | | |
|---|---|---|
| 4,802,686 A | 2/1989 | Isreal |
| 4,844,496 A | 7/1989 | Webb et al. |
| 5,161,815 A | 11/1992 | Penor, Jr. |
| 6,561,533 B2 * | 5/2003 | Snobl .......................... 280/204 |
| 6,874,807 B1 | 4/2005 | Labadie et al. |
| 2004/0207176 A1 | 10/2004 | Webster et al. |
| 2006/0103094 A1 | 5/2006 | Wiff et al. |
| 2008/0203066 A1 * | 8/2008 | Feldhausen et al. ............ 219/68 |
| 2010/0109268 A1 | 5/2010 | Koehler et al. |
| 2010/0225091 A1 | 9/2010 | Adkins et al. |

\* cited by examiner

COUPLING ARRANGEMENT FOR A DOLLY AND A DOLLY

The present invention relates to a dolly for transporting goods and in more particular a coupling device for connecting a dolly to another dolly or a tractor unit.

Known dollies of this type are known in the art and they are used for various applications, e.g. for carrying articles in industrial environments, especially in food industry and car industry and for carrying baggage in train or airport stations or airport or any place wherein transportation of goods on wheels is needed.

A dolly of this kind usually comprises a draw bar provided at one end of the dolly and a hook or similar device for connecting to the draw bar at the opposite end of the trolley. The goods carrying platform of the dolly is often constructed of lengths of steel profiles welded together. This carrying platform forms the body of the dolly. On this body, at its corners is mounted four wheels of which two are swivel wheels and two fixed, the swivel wheels being at the front end of the dolly to allow guiding the dolly to a desired direction. Sometimes also four swivel wheels are used for increased agility.

A towing unit may be any motorised or non-motorised which provides the fraction for the dolly. Most often the tractor unit is another dolly situated immediately in front of the line of dollies.

In known dollies the drawbar is generally in the form of a longitudinal element mounted in an articulated manner about the transverse axis of the trolley and provided on its front part a ring capable of co-operating with a hook on the towing unit.

U.S. Pat. No. 6,874,807 discloses a coupling device for a handling trolley, comprising a drawbar mounted at the front of the trolley and designed to co-operate with a hook mounted on the rear of a towing unit such the two such equipped trolleys may be connected together. The drawbar of one coupling device has a longitudinal slot in which the hook of another coupling device is able to slide so that the hook an slide in the longitudinal slot such the two trolleys may be connected together by the drawbar. The drawbar is connected to the front of the trolley by articulation means defining an articulation axis in such a way that as to pivot between a coupling position, in which the drawbar extends substantially horizontally in order to co-operate with the hook and a lifted position, in which the drawbar is in a raised position and is disengaged from the hook.

The problem related to the known coupling systems is that very often the coupling means are at least partially under the body of the dolly, whereby it is difficult the see the relative positions of the coupling hook and the slot. Because of this, the person handling the dollies must usually bend down to floor level and guide the draw bar and dollies to be coupled by hand, which is quite difficult, especially when dollies are loaded with heavy load. The working position is awkward and even mentally irritating. In the device described in U.S. Pat. No. 6,874,807 this problem is solved by positioning the connecting hook little bit outside the outer reach of the rear surface of the trolley. Now it is clearly easier to position the draw bar and connect the trolleys. However, the hook is protected by the body of the trolley and it may hit goods, people or any obstacle on the floor or even stuck to clothing of the personnel. In such case damage to the trolleys or other goods placed on the floor may occur or even human injuries happen.

The invention is intended to provide a coupling means that can be connected without exact guidance by the user.

The invention is based on having a female connecting part and a male connecting part, the male connecting part comprising a draw bar and a connecting peg and the female part comprises a sliding area, that is larger than the largest cross section of the connecting peg for easy positioning of the connecting peg and a guide surface at least partially surrounding the sliding area for guiding the connecting peg when pulled towards the guide surface, and a hole on the sliding surface dimensioned to contact with the connection peg and positioned in connection with the guide surface so that the peg can be directed to the hole by the guide surface.

According to one particular embodiment of the invention, the female part comprises an at least partially closed recess having an area limited by at least partially closed wall having a height and comprising at least a concave guiding part and a ceiling positioned to form the at least partially closed recess with the wall, and a hole in the ceiling at the tip of the concave part of the wall and dimensioned to receive the connecting peg.

According to one preferred embodiment of the invention, the at least partially closed wall comprises a V-shaped part with rounded tip and two parallel extensions extending from the arm of the V-shape.

Further, according to one embodiment, the connecting peg comprises a cylindrical body connected to the draw bar at one end and having a knob at the opposite end, the knob being shaped to extend at least partially over the diameter of the cylindrical body.

According to one feature of the invention, the ceiling has a stopping tongue extending away from the ceiling and towards the tip of the concave part of the at least partially closed wall and it has preferably a thickness less than the distance of the draw bar and the knob of the connecting peg.

According to one embodiment of the invention, the female connecting part is made of two metal plates that are welded together.

Further, according to one feature of the invention, the draw bar is attached to the dolly through a sliding connection.

More specifically, the invention is characterized by what is stated in the independent Claims.

Preferred embodiments of the invention are characterized by what is stated in the characterizing portions of the dependent Claims.

Considerable advantages are gained with the aid of the invention.

The invention comprises a sliding and guiding area against which a connection peg of a draw bar can be easily placed either by hand or guiding with leg. After that, the guide area directs the connection peg to its place to a connecting hole or similar receiving element automatically when the dollies are pulled away from each other. The sliding area is relatively large, especially larger than the diameter of the connection peg, so that the peg can be positioned against the area without difficulty not having to position it precisely.

Of the invention is that the draw bar can be connected to the female connecting part of another dolly without using hands or seeing the connecting parts. The female connecting part can be arranged wholly under the frame or body of the dolly, whereby it is always protected from damage. The assembly according to the invention has minimum of protruding parts, only the draw bar extends over the perimeter of the body of the dolly when the draw bar is turned to a connection position. In the lifted position the draw bar may be contained within the perimeter of the dolly in sideways direction. Thus any danger for entanglement with clothes or collision with other equipment or goods is prevented. The draw bar can be operated from a standing position simply by pushing the bar with foot.

In a standing position pushing the dollies loaded with goods is more easy than in a kneeling position for example, since standing position provides often best leverage.

The female locking part can be manufactured advantageously from a single piece of sheet metal by punching a hole on a metal plate and using the separated part for forming the ceiling of the locking part by welding it over the punched hole.

In the following, the invention is examined with the aid of examples and with reference to the accompanying drawings.

Figure 4:
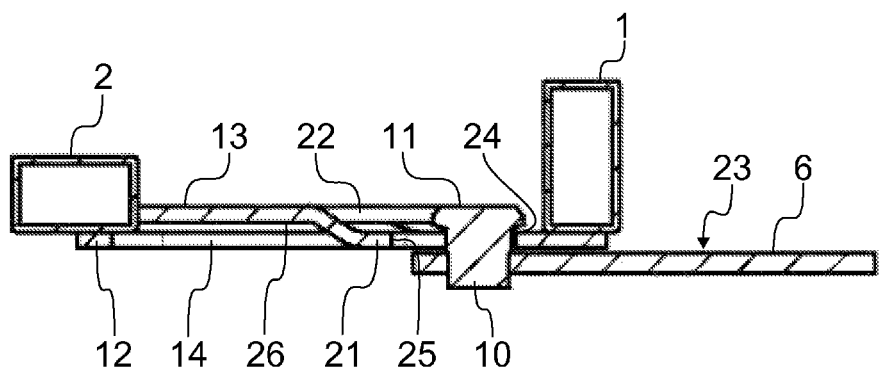
FIG. 4 is an enlarged view of locking arrangement of FIG. 3 from side, showing the male and female parts in locked position.
Figure 5:
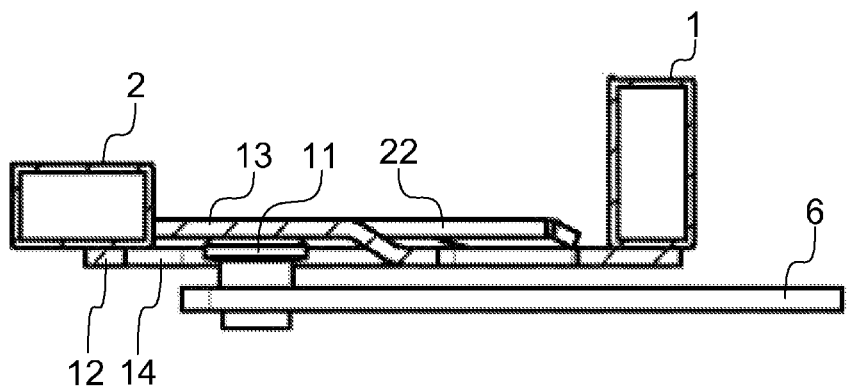

FIG. 5 corresponds with FIG. 4 but the parts are in guiding position.

Figure 6:
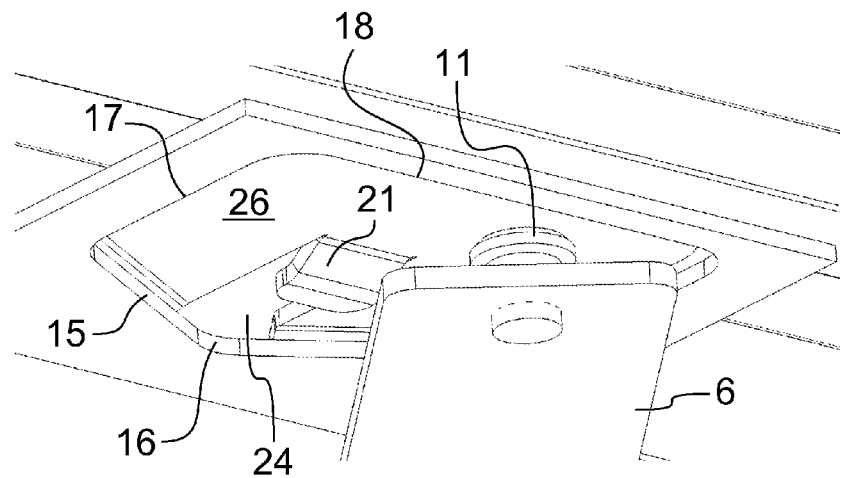

FIG. 6 is a view from below of the parts shown above in guiding position.

Figure 7:
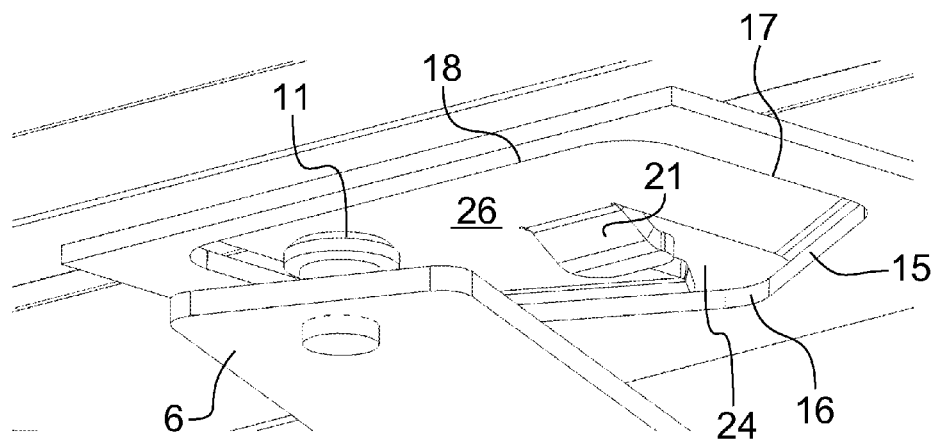

FIG. 7 is a second view from below of the parts shown above in guiding position.

Figure 8:
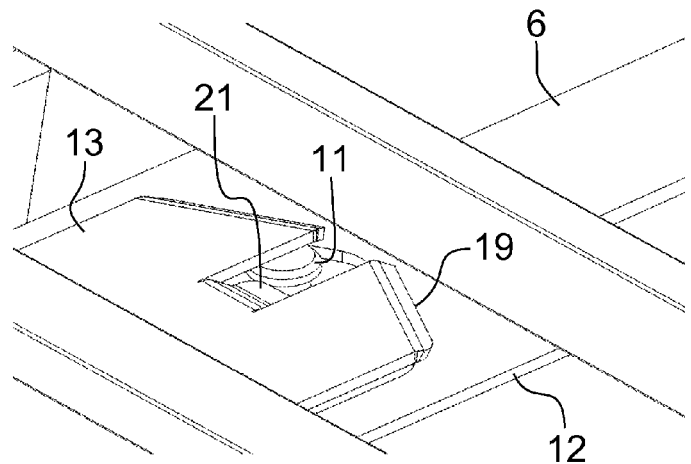

FIG. 8 is a view from above of the parts shown above in guiding position.

Figure 9:
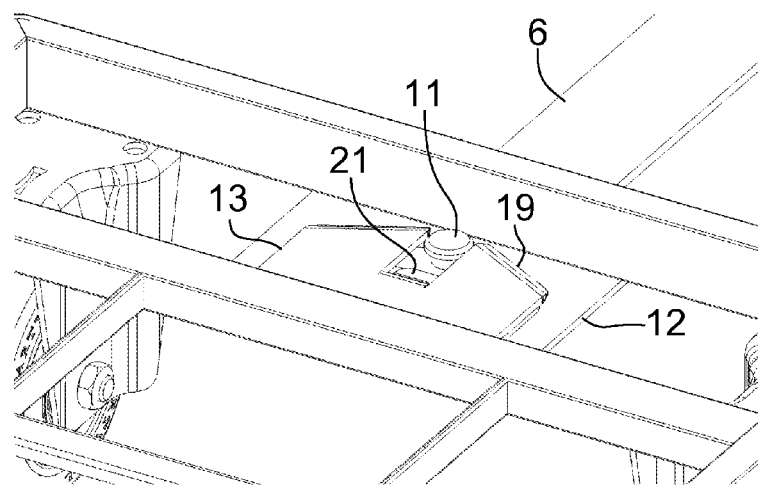

FIG. 9 is a view from above of the parts shown above in locked position.

Figure 10:
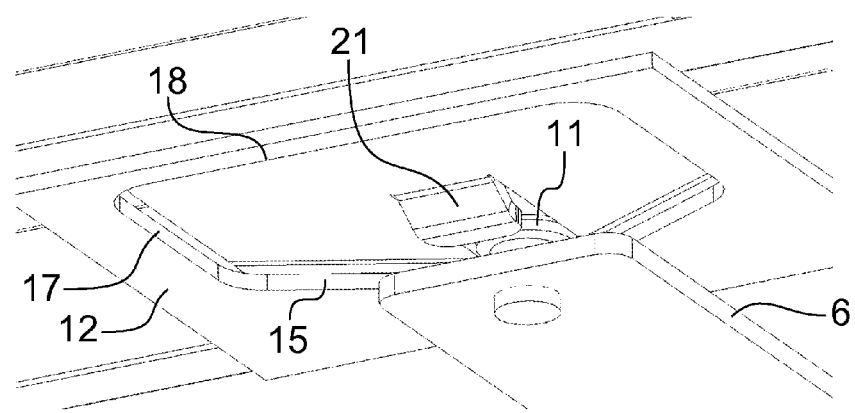

FIG. 10 view from below of the parts shown above in locked position.

Figure 11:
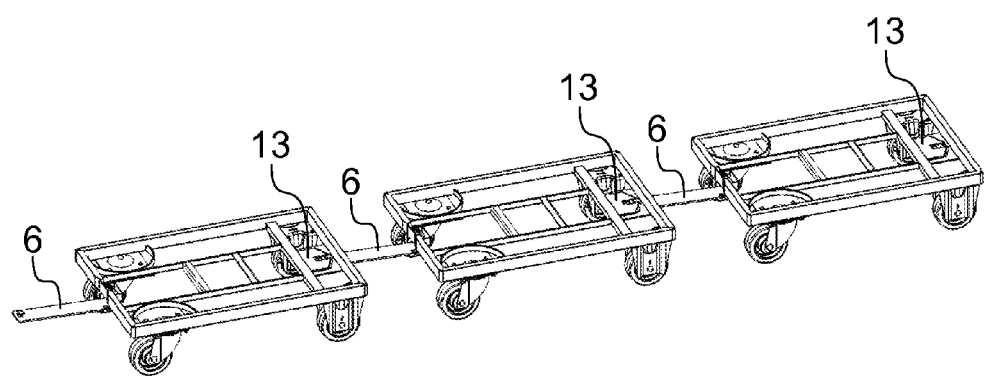

FIG. 11 shows a row of dollies joined together by means of the invention.

Figure 1:
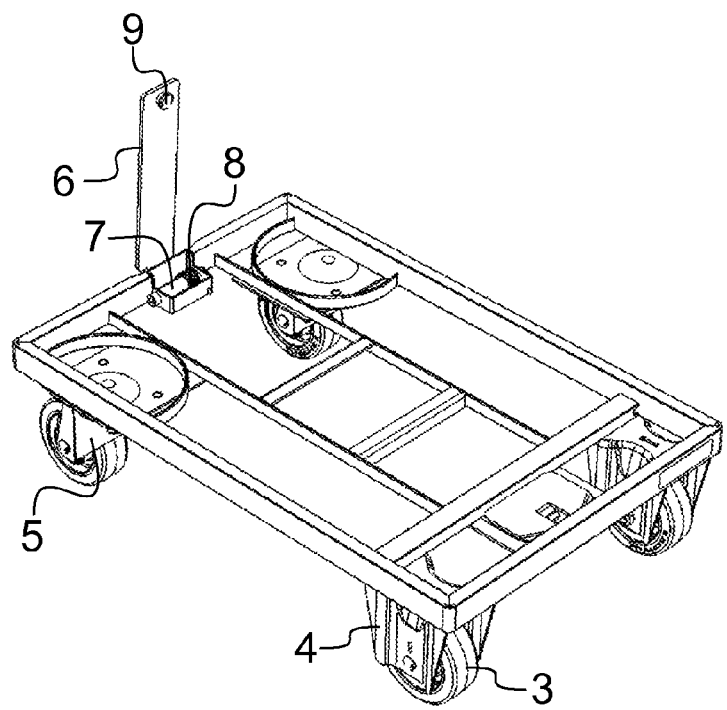
FIG. 1 shows a dolly equipped with one embodiment of the coupling arrangement according to the invention the draw bar in lifted position.
Figure 2:
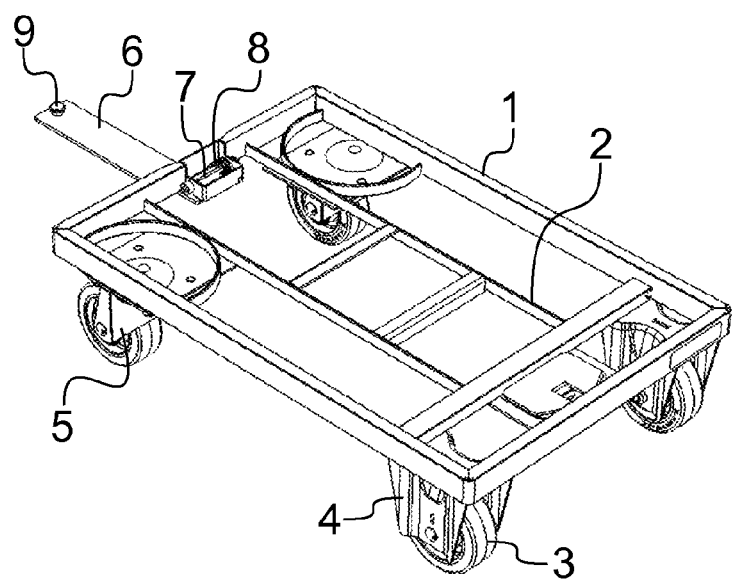
FIG. 2 shows the dolly of FIG. 1 the draw bar in connecting position.

FIGS. 1 and 2 show a typical dolly for transporting various goods and platforms. The body of the dolly is made of tubular or solid steel sections that are welded together to form a rectangular frame. The outer perimeter of the body is formed of higher profiles and the frame is rigidified with crosswise lower profiles 2 whereby the higher profiles 1 form edge walls and crosswise profiles support surface for various platforms like crates, honeycomb boards or any other goods or devices that are transported by the dolly. The higher side walls prevent the platforms of goods to slide away from the dolly. At each corner of the dolly are transport wheels 3 mounted to the dolly either by fixed 4 or swivel 5 wheel mounts. Usually, a pair of fixed wheel mounts 4 with wheels is placed at one end of the dolly and this end is the back end of the dolly. Wheels 3 with the swivel mounts 5 are at opposite end, which is usually the front end. The dolly is moved to direction of the rotary wheels 3,5 since it is more easy to guide in right direction that way. It must be noted that the dolly described herein is just an example of various dollies and trolleys to which this invention can be applied and the structure or design of the dolly does not limit the scope of the invention. How the wheels are arranged is determined by wheel standard, which should be complied.

In FIG. 1 the draw bar 6 is an upright position. It is mounted on the dolly at the centre of one short wall of the body 1, 2, in this case the front end which is advantageous, by a rotary axle 7 which is equipped with a spring 8. The spring is arranged to turn and hold the draw bar 6 in an upright position at all times when the dolly is not connected to any tractor device. In upright position the draw bar does not extend over the confines of the dolly if a recess for it is provided in the front wall, but even if it is flat on the front wall, the extension is minimum and the position is both safety- and spacewise good. As a spring, a spiral, torsion or any other spring or equivalent passive actuator element providing the turning action can be used. At the opposite end of the draw bar in view of the mounting rotary axle 7 is a connecting peg 9 that comprises a cylindrical body 10 connected to the draw bar 6 at one end and having a knob 11 at the opposite end, the knob being shaped to extend at least partially over the diameter of the cylindrical body. A preferred form of the connecting peg is a symmetrical mushroom, but a T-shape, hook, rectangular or other form having extension pointing away from the centreline of the body 10 at the end of the body might be usable. The knob may be excluded, but then the locking function provided by it is lost.

Figure 3:
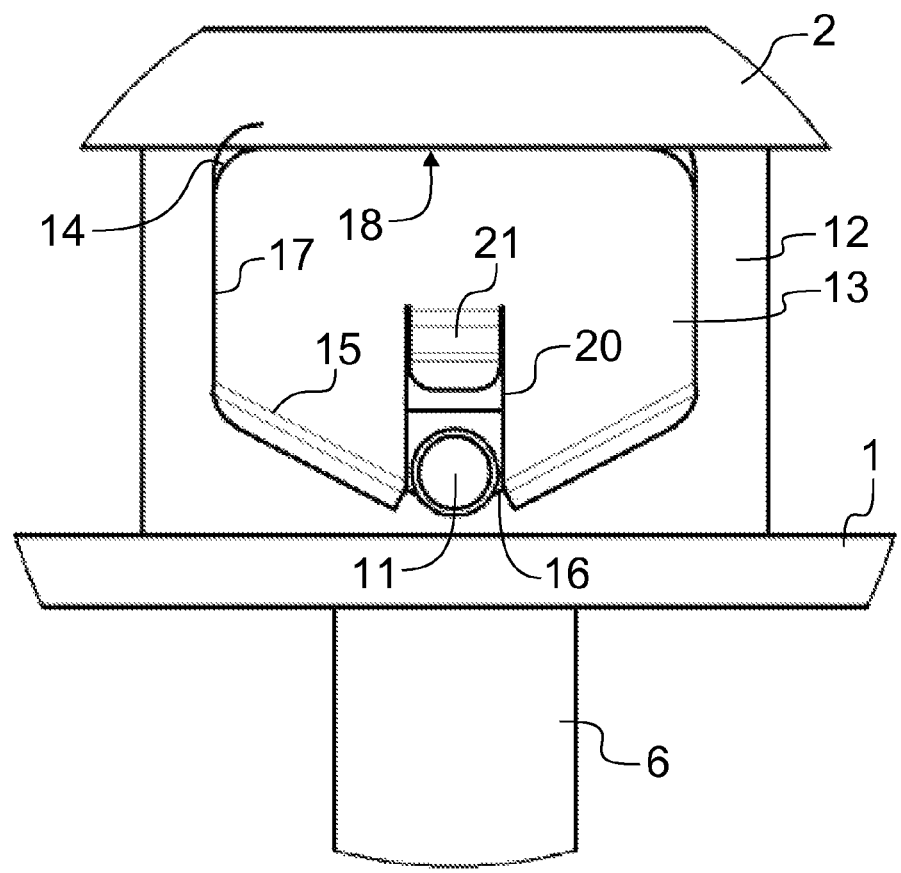
FIG. 3 is an enlarged view of locking arrangement of FIGS. 1 and 2 from above.

The structure of the female connection part is shown in FIGS. 3 and 4. It comprises in this embodiment two plates, a base plate 12 and top plate 13. The base plate 12 is a rectangular flat plate that is attached underneath the profile 1 forming the back wall of the body of the dolly and a crosswise profile 2 running parallel to the back wall. This is only an example of the positioning of the female connection part. The mounting of it depends of the type of the dolly. Only important thing is that it should be underneath the body of the dolly. The base plate comprises a hole that is formed to have a concave shape 15, especially a V-shape having a rounded tip 16, and two parallel extensions 17 running away from the outer edges of the concave shape 15 and ending to a crosswise straight edge 18 that joins the extension through rounded corners. The shape of the hole may vary, but the essential feature is that it must have concave guiding surface formed by the concave shape. For example, parabolic, elliptical or even discontinuous shapes may be used as long as the hole forms at least some kind of a concave part. The base plate is mounted on the dolly so that the tip 16 of the concave part points towards the back wall of the dolly.

The top plate 13 is preferably the part of the base plate that is cut away from it during making of the hole 14. It has the same shape as the hole 14 except that the concave guiding part 15 is now convex to outwards and has a straight edged groove 20 formed at the tip of the convex part. This groove 20 is formed by cutting away some of the material of the top plate 13 and bending the rest towards the base plate as a stopping tongue 21. The top plate 13 is positioned on the base plate so that the convex edge 19 is somewhat over the concave shape of the hole 14 of the base plate 12. Now the top plate 13 can be attached to the base plate 12 along the straight edges 17 and along the convex part 19. If the plates 12, 13 are made of steel, one suitable joining method is welding, otherwise any joining method suitable for the material to be used should be chosen. Now, as can be seen from FIG. 4, the top plate 13 forms a ceiling 26 over the hole 14 and the groove 20 an opening 22. The opening is dimensioned so that the knob 11 of the connecting peg 9 fits through the opening. The distance between the knob 11 and the surface 23 of the draw bar 6 is at least same as the thickness of the base plate 12 so that the opening 24 of the base plate 12 fits between the underside of the knob 11 and the surface 23 of the draw bar 6. This provides a locking function for the draw bar 6. Similarly, the tip 25 of the stopping tongue 21 is placed on the same level as the base plate 12, and, since it is of same material as the base plate 12, it also fits under the knob 11. The recess formed by the base plate 12 and the top plate 13 can be made deeper by bending the edges of the top plate 13 slightly so that the surface of the top plate 13 forming the ceiling 26 is distanced from the lower surface of the base plate 12. Also, adapter plates or rings or similar elements could be used for this purpose, but that would increase the number of the parts.

The assembly operates as shown on FIGS. 5-10. As can be seen, the knob 11 of the draw bar 6 sets on the hole of the top plate 13 when it is turned in connecting position (horizontal) and pushed under a towing dolly. Now, the knob rests on the ceiling 26 of the recess formed by the hole 14 and is pushed towards the ceiling 26 by the spring 8 of the draw bar 6. When the dollies are moved, the knob is guided by the edges of the recess (hole in the base plate) towards the tip 16 of the concave part 15. When it reaches that point, the spring 8 lifts the knob to the opening 24 at there and the knob is locked by the edges of the base plate and the stopping tongue. However, it must be noted that some play is necessary to allow the knob 11 to enter the opening. Anyway, the knob locks the bar in both directions in relation to the movement of the dollies, when they are pushed together and when they are drawn away from each other.

To operate the draw bar to lock and release the dollies, it can be pushed in horizontal position for locking by foot or hand and, for release; small push downwards is enough to push the knob 11 off the opening 24.

The invention may be varied in several ways. The female part comprising an at least partially closed recess may be closed or open. The closed embodiment gives guidance in all directions. The draw bar may be attached to the dolly by a slidable telescopic connection to allow dollies to be pushed together. This embodiment is somewhat more difficult to operate since in some positions the draw bar must be drawn by hand under the dolly. The positions of the female and male connecting part may be interchanged. Regarding materials, steel is preferable as well as the plate configuration described above, but any reasonable strong construction material is feasible as well as any manufacturing method.

The invention claimed is:

1. A coupling arrangement for a dolly, comprising:
a female connecting part and a male connecting part, wherein:
the male connecting part comprises:
a draw bar and a connecting peg,
the female connecting part comprises:
a sliding area, that is larger than a largest cross section of the connecting peg, for easy positioning of the connecting peg,
a guide surface at least partially surrounding the sliding area for guiding the connecting peg when pulled towards the guide surface, and
a hole on the guide surface dimensioned to contact with the connecting peg and positioned in connection with the guide surface so that the connecting peg is directed to the hole by the guide surface,
wherein:
the female connecting part of the coupling arrangement is arranged wholly under the dolly, and
the draw bar comprises a spring for turning the draw bar to an upright position,
wherein the female connecting part further comprises an at least partially closed recess having an area limited by at least a partially closed wall having a height and comprising at least a concave guiding part and a ceiling positioned to form the at least partially closed recess with the closed wall, another hole in the ceiling at a rounded tip of the concave guiding part of the closed wall, and dimensioned to receive the connecting peg.

2. The coupling arrangement according to claim 1, wherein the connecting peg further comprises a cylindrical body connected to the draw bar at one end and having a knob being shaped to extend at least partially over a diameter of the cylindrical body.

3. The coupling arrangement according to claim 2, wherein a ceiling has a stopping tongue extending away from the ceiling and towards the rounded tip of the concave guiding part of the at least partially closed wall, and
the stopping tongue has a thickness less than a distance from the draw bar and to the knob of the connecting peg.

4. The coupling arrangement according to claim 2, wherein the female connecting part is made of two metal plates that are welded together.

5. The coupling arrangement according to claim 1, wherein the ceiling has a stopping tongue extending away from the ceiling and towards a rounded tip of a concave guiding part of the at least partially closed wall, and
the stopping tongue has a thickness less than a distance from the draw bar to a knob of the connecting peg.

6. The coupling arrangement according to claim 5, wherein the female connecting part is made of two metal plates that are welded together.

7. A dolly comprising a body for carrying goods and wheels allowing transportation of the dolly mounted on the body, wherein the dolly arranged is equipped with the coupling arrangement according to claim 1.

8. A coupling arrangement for a dolly, comprising:
a female connecting part and a male connecting part, wherein:
the male connecting part comprises:
a draw bar and a connecting peg,
the female connecting part comprises:
a sliding area, that is larger than a largest cross section of the connecting peg, for easy positioning of the connecting peg,
a guide surface at least partially surrounding the sliding area for guiding the connecting peg when pulled towards the guide surface, and
a hole on the guide surface dimensioned to contact with the connecting peg and positioned in connection with the guide surface so that the connecting peg is directed to the hole by the guide surface,
wherein:
the female connecting part of the coupling arrangement is arranged wholly under the dolly, and
the draw bar comprises a spring for turning the draw bar to an upright position,
wherein the female connecting part further comprises an at least partially closed recess having an area limited by at least a partially closed wall having a height and comprising at least a concave guiding part and a ceiling positioned to form the at least partially closed recess with the closed wall, another hole in the ceiling at a rounded tip of the concave guiding part of the closed wall, and dimensioned to receive the connecting peg, and
wherein the draw bar is attached to the dolly through a sliding connection.

9. The coupling arrangement according to claim 8, wherein the at least partially closed wall comprises a V-shaped part with the rounded tip and two parallel extensions extending from the arms of the V-shape.

10. The coupling arrangement according to claim 9, wherein the connecting peg further comprises a cylindrical body connected to the draw bar at one end and having a knob shaped to extend at least partially over a diameter of the cylindrical body.

11. The coupling arrangement according to claim 9, wherein the female connecting part is made of two metal plates that are welded together.

12. The coupling arrangement according to claim 8, wherein the connecting peg further comprises a cylindrical body connected to the draw bar at one end and having a knob being shaped to extend at least partially over a diameter of the cylindrical body.

13. The coupling arrangement according to claim 8, wherein the ceiling has a stopping tongue extending away from the ceiling and towards the rounded tip of the concave guiding part of the at least partially closed wall and
the stopping tongue has a thickness less than a distance from the draw bar to a knob of the connecting peg.

14. The coupling arrangement according to claim 8, wherein the female connecting part is made of two metal plates that are welded together.

15. A coupling arrangement for a dolly, comprising:
a female connecting part and a male connecting part, wherein:
the male connecting part comprises:
a draw bar and a connecting peg,
the female connecting part comprises:
a sliding area, that is larger than a largest cross section of the connecting peg, for easy positioning of the connecting peg,
a guide surface at least partially surrounding the sliding area for guiding the connecting peg when pulled towards the guide surface, and
a hole on the guide surface dimensioned to contact with the connecting peg and positioned in connection with the guide surface so that the connecting peg is directed to the hole by the guide surface,
wherein:
the female connecting part of the coupling arrangement is arranged wholly under the dolly, and
the draw bar comprises a spring for turning the draw bar to an upright position,
wherein the female connecting part further comprises an at least partially closed recess having an area limited by at least a partially closed wall having a height and comprising at least a concave guiding part and a ceiling positioned to form the at least partially closed recess with the closed wall, another hole in the ceiling at a rounded tip of the concave guiding part of the closed wall, and dimensioned to receive the connecting peg,
wherein the at least partially closed wall comprises a V-shaped part with the rounded tip and two parallel extensions extending from the arms of the V-shape,
wherein the female connecting part is made of two metal plates that are welded together, and
wherein the ceiling has a stopping tongue extending away from the ceiling and towards a tip of the concave guiding part of the at least partially closed wall, and
the stopping tongue has a thickness less than a distance from the draw bar and to a knob of the connecting peg.

* * * * *